May 23, 1950 E. L. MORRIS 2,508,836
BUMPER FOR AUTOMOBILES
Filed Dec. 30, 1946 2 Sheets-Sheet 1

INVENTOR.
Elmer L. Morris
BY
Mawhinney & Mawhinney
Attorneys

May 23, 1950     E. L. MORRIS     2,508,836
BUMPER FOR AUTOMOBILES
Filed Dec. 30, 1946     2 Sheets-Sheet 2
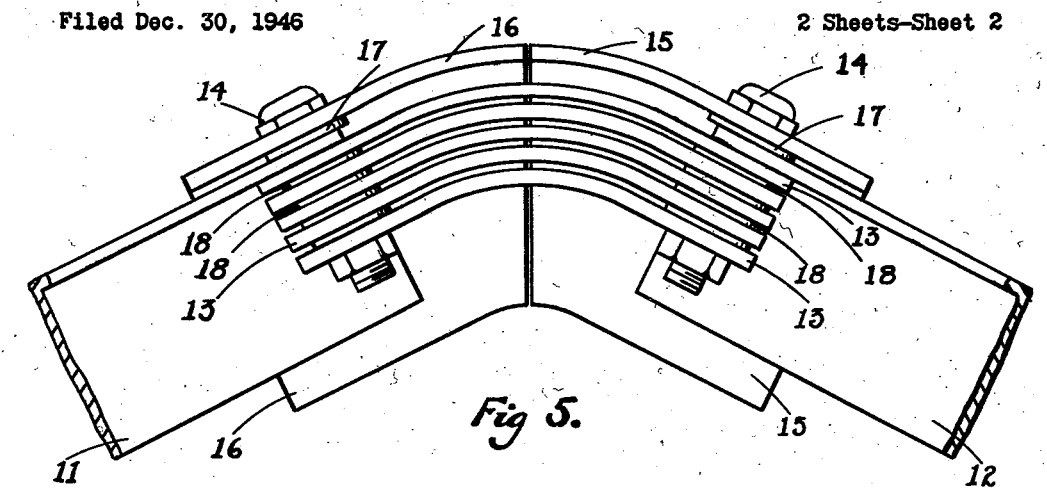
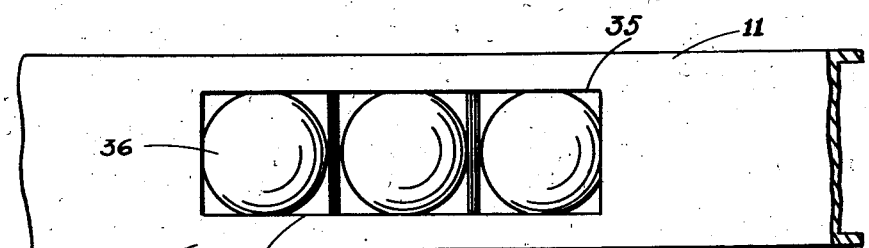
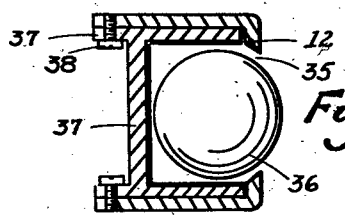
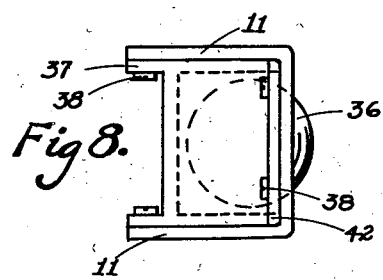
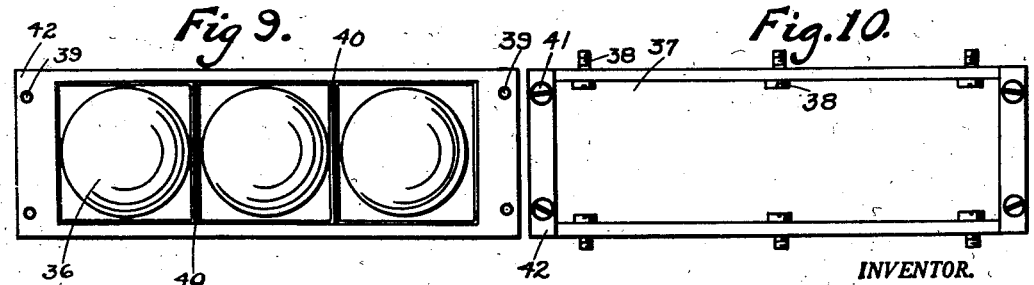
INVENTOR.
Elmer L. Morris
BY
Mawhinney & Mawhinney
Attorneys Patented May 23, 1950

2,508,836

UNITED STATES PATENT OFFICE 2,508,836

BUMPER FOR AUTOMOBILES

Elmer L. Morris, Mobile, Ala.

Application December 30, 1946, Serial No. 719,163

3 Claims. (Cl. 293—89)

The present invention relates to improvements in bumpers for automobiles and has for an object to provide an improved bumper having great strength with simplicity of construction and an improved arrangement for fending off encountered objects and bodies.

Another object of the invention is to provide a double or duplex shock-absorbing means whereby the initial shock is absorbed by a double spring action, and any remaining shock is absorbed in the hydraulic shock-absorbers by which the improved bumper is attached to the chassis of the vehicle.

A further advantage of the invention resides in an improved bumper or buffer bar having installed therein ball impact receiving elements arranged on a diagonal or inclination to the longitudinal axis of the vehicle whereby the buffer or bumper bar will encounter obstacles and glancing blows received upon the rotary balls which will have the effect to turn aside such obstacles out of the path of the vehicle with greater effect.

A still further object of the invention is to so arrange the ball impact surfaces of the bumper, where the same are used, so that such balls have rotary motion not only in a horizontal sense but also in a vertical plane whereby to deflect objects struck either up or down with great effectiveness.

A still further object of the invention is to provide an improved novel type of bumper in that the V-arranged impact or buffer bars have a sliding movement with reference to an adjusting or compensating bar to which such buffer bars are also spring connected with the compensating bar connected to the vehicle chassis by hydraulic shock-absorbers, the pistons of which must be simultaneously driven inwardly to prevent jamming of the piston or piston rods, which result is achieved by the automatic adjustment of such compensating bar.

A further purpose of the invention is to provide V-arranged duplex buffer bars spring connected at their proximate ends with nose pieces to encase and protect the spring elements and with such bars arranged to move independently backwards when striking an object, the same being also adapted to move back simultaneously when the nose pieces simultaneously encounter an obstacle, with means to carry such bars to permit their individual or simultaneous rearward sliding movement.

With the foregoing and other objects in view, the invention will be more fully described hereinafter and more particularly pointed out in the appended claims.

In the drawings, in which like parts are denoted by the same reference characters throughout the several views, Figure 1 is a top plan view of an improved bumper constructed in accordance with the present invention and shown as connected to a vehicle chassis partly broken away and partly shown in section.

Figure 5 is a horizontal section taken on an enlarged scale through the nose of the bumper showing the leaf springs connecting the buffer bars and the encasing nose shields.

Figure 6 is a fragmentary front elevation of one of the buffer bars showing the balls as the same appear looked at in the direction of the arrows 6 in Figure 1.

Figure 7 is a vertical transverse section taken through one of the buffer bars on the line 7—7 in Figure 1.

Figure 8 is a similar view taken on the line 8—8 in Figure 1.

Figure 9 is a front elevational view of a set of balls and the ball retainer or cage.

Figure 10 is a rear elevational view of such ball retainer or cage.

Figure 1:
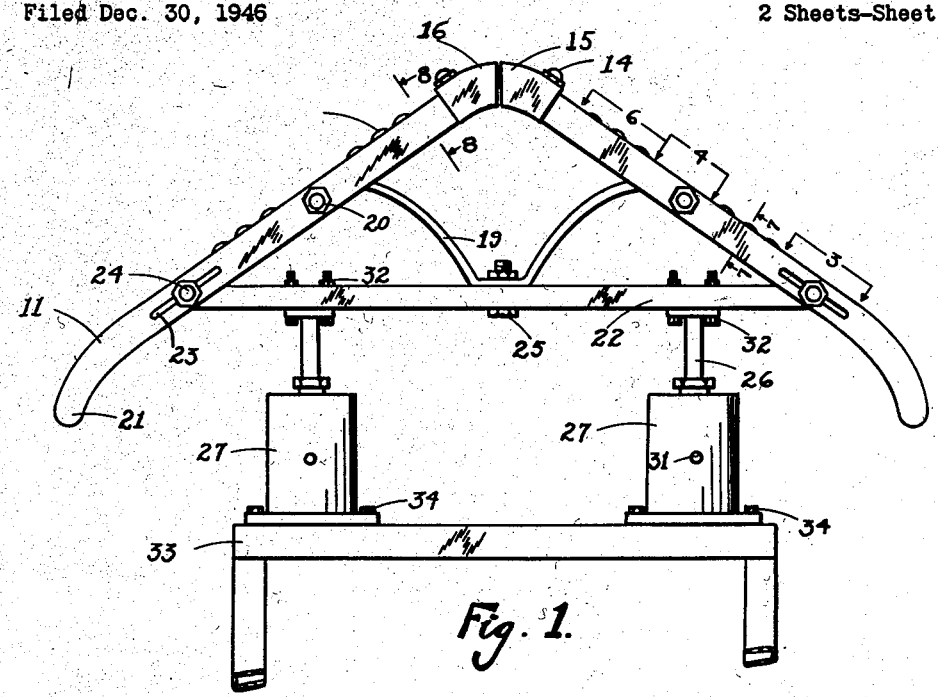

Referring more particularly to the drawings 11 and 12 represent a pair of buffer bars preferably made from steel or other strong material and also preferably of a channel form for purposes of strength. It will be noted from Figure 1 that these buffer bars 11 and 12 are arranged in a V-formation. Otherwise stated these bars 11 and 12 are diagonal or inclined with respect both to the longitudinal and transverse axes of the automobile or vehicle by which they are carried. The front proximate ends of the buffer bars 11 and 12 terminate short of one another, as best seen in Figure 5, and the same are connected by a plurality of leaf springs 13 made of steel or other strong construction and being connected to one another and to the ends of the buffer bars by the bolts 14. The center or nose of the bumper is formed by two cover or nose pieces 15 and 16 of steel or other construction also of a channel shape slightly larger than the channels of the buffer bars 11 and 12 so as to overlap the ends of the same. These nose pieces may come very close together at their near or proximate ends and they are curved or of elbow shape in order to fit together centrally and at the same time envelop the inclined ends of the buffer bars 11 and 12. Such nose pieces 15 and 16 are also attached in place conveniently by the bolts 14, gaskets or washers 17 of leather, rubber or composition being interposed between the respective nose pieces and buffer bars. Spreader gaskets or washers 18 are also interposed between the end leaves of the multiple steel springs 13 to avoid rattling.

Steel bar springs 19 are connected at their near ends by a bolt 25 to the central portion of a transverse adjusting or compensating bar 22. Such springs 19 constitute the initial shock absorbers and are outwardly and forwardly bowed to meet outer portions of the inclined buffer bars 11 and 12 to which they are respectively pivoted upon bolts 20. The rear free divergent ends of the buffer bars 11 and 12 are preferably incurved as indicated at 21.

Figures 2, 3, 4:
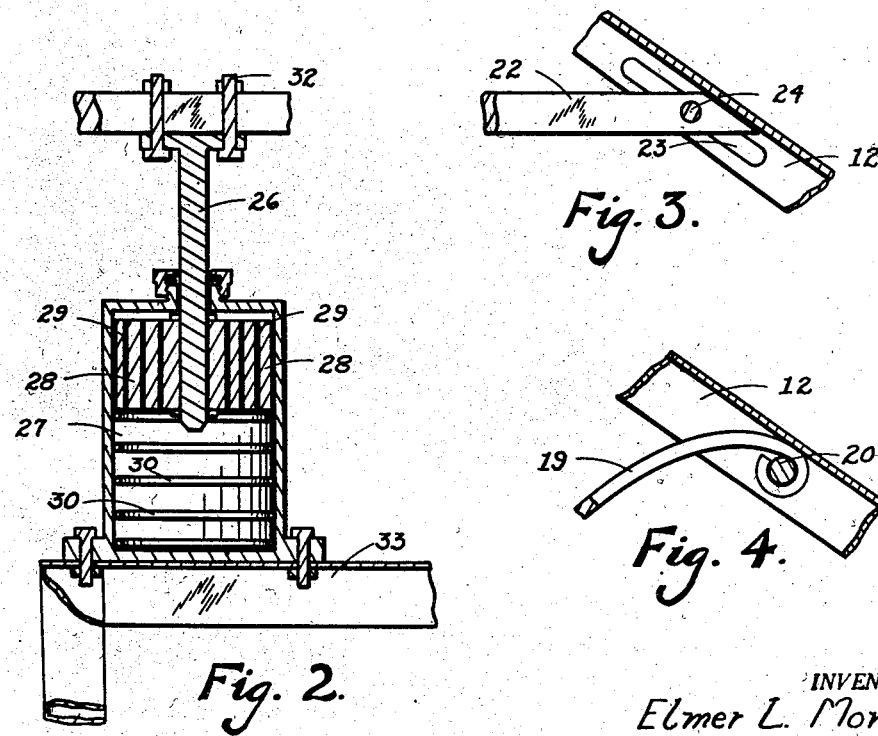
Figure 2 is a horizontal, longitudinal sectional view taken on an enlarged scale through one of the hydraulic shock-absorbers and its connections.
Figure 3 is a fragmentary horizontal section taken between the compensating bar and one of the buffer bars showing the slide connection, the view being taken along the line of the arrows indicated at 3 in Figure 1.
Figure 4 is a similar view taken along the line of the arrows 4 in Figure 1 and showing the connection between the bar bow spring and one of the buffer bars.

As shown more particularly in Figure 3 the inclined ends of the adjusting or compensating bar 22 engage the front webs of the buffer bars 11 and 12 while bolts 24 carried by the end portions of the bar 22 are received through slots 23 made in the flanges of the buffer bars 11 and 12.

The adjusting or compensating bar 22 is carried by hydraulic piston rods 26 affixed to the end portions of the compensating bar 22. Such rods 26 enter the hydraulic cylinders 27 and are connected to the hydraulic pistons 28.

As best seen in Figure 2 the pistons 28 are traversed longitudinally by through holes or passages 29 by which the hydraulic fluid may flow from one side of the piston to the other to check or slow its movement. The pistons are normally biased to an outer position by springs 30 seated beneath such pistons. Hydraulic fluid may from time to time be supplied to the cylinders through openings normally closed by screw caps or plugs 31. The forward ends of the piston rods 26 are connected to the compensating bar at one side of its center by the bolts 32 or other appropriate fastenings; while the bases of the hydraulic cylinders 27 are connected to the vehicle chassis 33 as by the bolts 34 or other appropriate fastenings.

As more particularly seen in Figures 6 to 10 inclusive the forward faces or webs of the buffer bars 11 and 12 may be provided at suitable intervals with openings or slots 35 through which project a number of steel balls 36 held in ball cups or retainers or cages 37. The cages are connected as by screws 38 to the upper and lower flanges of the buffer bars, as shown in Figures 7 and 8, and also by screws 41 passing through holes 39 in the flanges 42 and taking into appropriate threaded openings in the webs of the buffer bars. Partitions or divisions 40 (Figure 9) may be inserted in the ball retainers 37 to establish individual compartments for the separate balls 36. These divisions or partitions 40 and also if desired the top and bottom walls of the ball retainers 37 may be lined or coated with the material which will deaden the sound of rotary movement of the balls.

In the use of the invention it will be noted that the two buffer bars or members 11 and 12 together with their respective cover or nose pieces 15 and 16 have entirely free and independent movement in response to blows to which they may be subjected. If a blow is struck upon the buffer bar 12 or its nose piece 16 the same may move backwardly with respect to the companion buffer bar 11 and the companion nose piece 16, such action being permitted by the flexibility of the leaf springs 13. Incidentally such leaf springs 13 will naturally resist the backward movement of the buffer bar 12 and will thus act although perhaps in a minor manner as a shock absorbing agency. A second shock absorbing agency is incorporated in the bar bow springs 19 which also resist the backward movement of either or both buffer bars in resistance to blows struck by them upon bodies or objects incident to the forward motion of the vehicle.

It will be noted that the buffer bars 11 and 12 act in a unitary manner in that backward movement of one bar while initially moving relatively to the companion bar will through the leaf springs 13 eventually entrain such companion bar to move rearwardly with the object-striking bar and thus the resistance force of both bar bow springs 19 will eventually be brought to bear in resisting and absorbing shocks. Thus the buffer bars have both individual and conjoint action. The combination of the two actions stemming from the springs 13 and 19 are useful to help absorb the instant impact of the blows or bump.

Blows at either the center of the cover parts 15, 16 or upon the individual buffer bars 11 and 12 tend to spread the buffer bars apart at the nose pieces 15 and 16. Such spreading movement entails sliding movement of one or other or eventually both of the buffer bars 11 and 12 upon the adjusting or compensating bar 22. Ordinarily the bolts 24 are tightened to an extent that the buffer bars 11 and 12 are held firmly fixed in proper position upon the adjusting bar 22 but a high pressure blow on the bumper will cause the buffer bars 11 and 12 to slide upon the bolts 24 and the resistance set up by the tightened bolts 24 to this sliding movement gives a third shock absorbing cushion. This resistance in the bolts 24 also has a tendency to carry the compensating bar 22 backwardly with the buffer bars 11 and 12 and thus bring into play a fourth shock absorbing agency in the parts of the hydraulic pistons and cylinders 27 and 28. The lengths of the slots 23 may be such that on severe blows the end walls of these slots will eventually encounter the bolts 24 and entrain the adjusting bar 22 in the backward movement in which case the plungers or pistons 28 will be driven backwardly in the hydraulic cylinders 27, which movement is resisted by the combined force of the coil spring 30 and the body of hydraulic fluid in the cylinders. This hydraulic fluid may pass through the restricted passages 29 at a preselected rate so that the movements of the pistons backwardly into the cylinders 27 may be nicely gauged. After the shock has passed the springs 30 will restore the pistons 28 to the outward position shown in Figure 2, this action also taking place slowly due to the retransfer of the hydraulic fluid to the rear sides of the pistons.

It will be noted that whereas the adjusting or compensating bar 22 is attached to both pistons such bar must at all times preserve its correct transverse alignment in moving forwards and backwards. In other words such bar 22 may not be tilted or canted. To do so would cause jamming of the pistons 28 in the cylinders 27.

Consequently the bow springs 19 are connected preferably to the center of the compensating bar 22 so that the pressure of the two springs 19 may be equally felt upon both pistons 28. The ball arrangement shown in Figures 6 to 10 may be applied to any type bumper bar, such for instance as the conventional bumpers now in current use on automobiles. It will be noted that the construction is extremely simple and that the same may be installed simply and easily upon any customary form of bumper bar by simply cutting the proper opening and tapping holes in the bumper to accommodate the screws 38. It may not be necessary to use all of the holes. The ball retainers may in fact be attached to the bumpers in any suitable manner. Each separate division of the ball retainer contains a ball 36. The section itself may be lined with a thin rubber coating or sprayed with a rubber or plastic fluid to prevent the balls from making noise.

These balls and their retainers also aid the spring action in absorbing shocks. The balls also throw aside the object hit. Because the balls may move horizontally and also vertically they may move objects to either side or up and down in a universal manner.

It is obvious that various changes and modifications may be made in the details of construction and design of the above specifically described embodiment of this invention without departing from the spirit thereof, such changes and modifications being restricted only by the scope of the following claims.

What I claim is:

1. An improved vehicle bumper comprising a pair of buffer bars obliquely disposed and converging toward a front center line, multiple leaf springs connected to the adjacent ends of said buffer bars, an adjusting compensating bar arranged crosswise of the buffer bars spaced backwardly from said leaf springs with its ends intersecting rear portions of said buffer bars, slidable connections between the ends of said adjusting compensating bar and said buffer bars, intermediate springs connected between an intermediate portion of said adjusting compensating bar and intermediate portions of said buffer bars, and inner springs supporting said adjusting compensating bar.

2. A bumper as claimed in claim 1 characterized by the fact that the multiple leaf springs are curved and a nose piece bridges the portion between the convergent ends of said buffer bars.

3. A bumper as claimed in claim 1 characterized by the fact that the convergent ends of the buffer bars are spaced apart with the multiple leaf springs being curved with their convexities forward and carried upon bolts with spacers between the leaf springs, and with a nose piece affixed to said buffer bars and spanning the space between the same and covering said leaf springs.

ELMER L. MORRIS.

REFERENCES CITED

The following references are of record in the file of this patent:

UNITED STATES PATENTS

| Number | Name | Date |
|---|---|---|
| 552,927 | Rodgers | Jan. 14, 1896 |
| 1,224,817 | Westover | May 1, 1917 |
| 1,355,592 | De Graw | Oct. 12, 1920 |
| 1,406,828 | Dyer | Feb. 14, 1922 |
| 1,467,640 | Ilich | Sept. 11, 1923 |
| 1,564,279 | Ross | Dec. 8, 1925 |
| 1,665,085 | Cunningham | Apr. 3, 1928 |
| 1,901,227 | Cossalter | Mar. 14, 1933 |
| 1,936,054 | Harzbecker | Nov. 21, 1933 |
| 2,058,076 | Glascodine | Oct. 20, 1936 |
| 2,090,659 | Zimmer | Aug. 24, 1937 |